United States Patent Office 2,988,451
Patented June 13, 1961

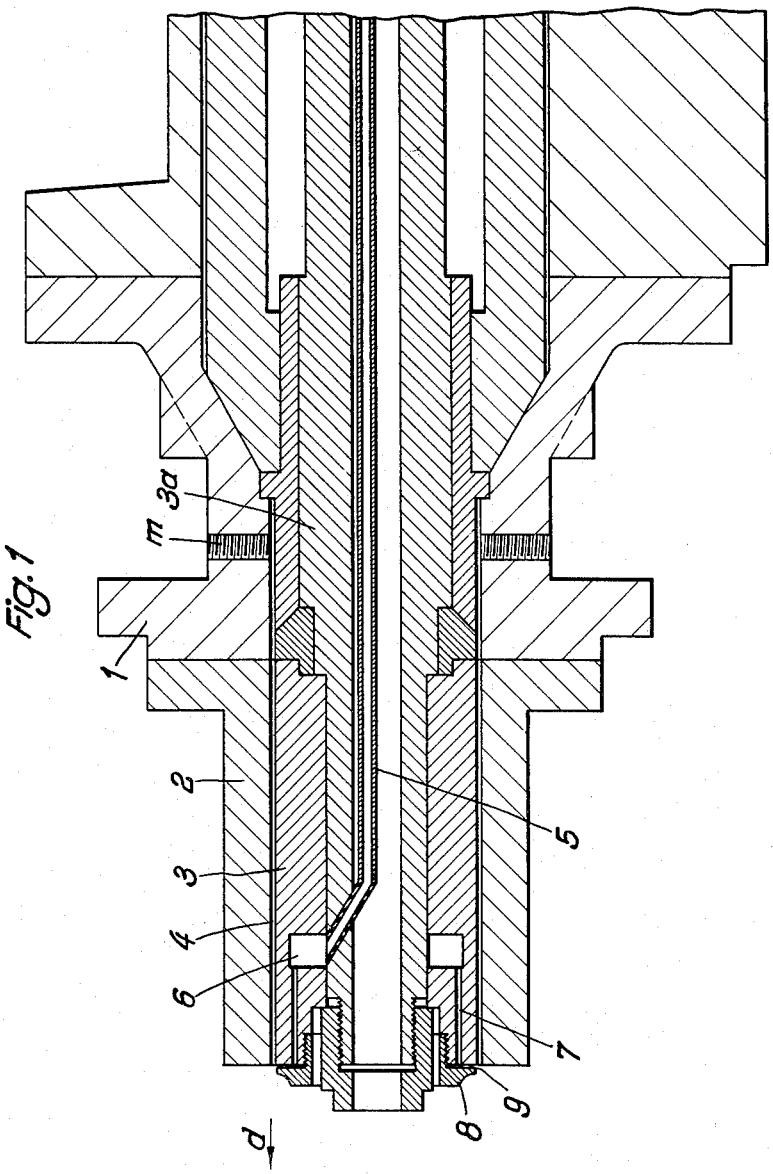

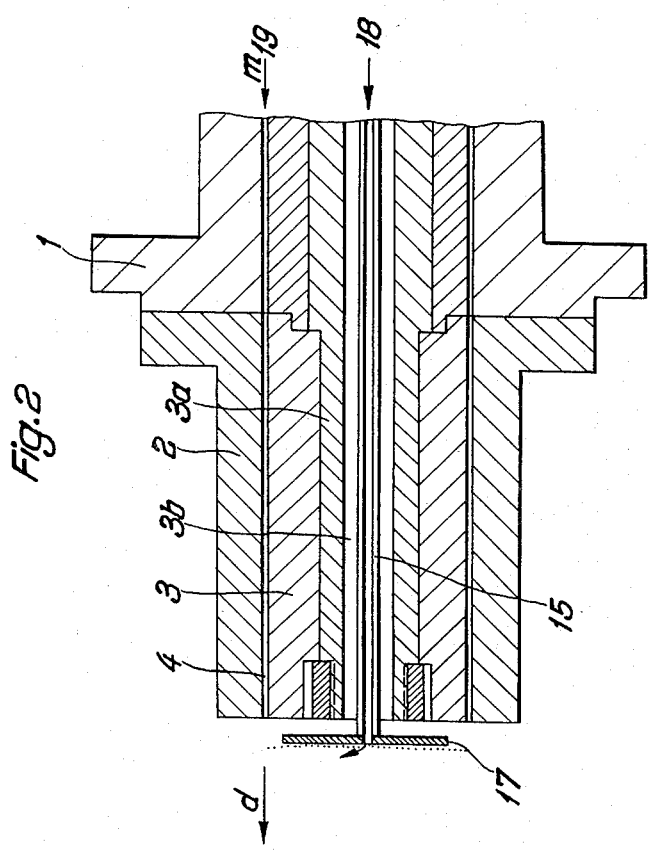
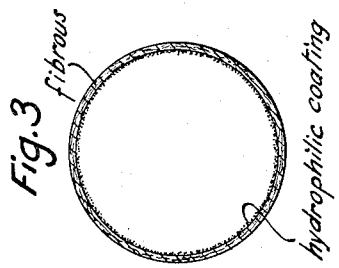

2,988,451
READILY REMOVABLE ARTIFICIAL SAUSAGE CASINGS AND METHOD OF PREPARATION
Helmut Zahn, Aachen, Germany, assignor to Naturin-Werk Becker & Co., Weinheim an der Bergstrasse, Germany
Filed July 1, 1958, Ser. No. 745,909
Claims priority, application Germany July 5, 1957
4 Claims. (Cl. 99—176)

The invention relates to sausage casings.

It is a well known drawback of sausage casings that they may adhere too firmly to the sausage meat and do not allow clean skinning.

It is a principal object of the invention to provide a method of preparing artificial sausage casings which are readily stripped off any kind of sausages without tearing off meat or partially remaining on the sausage meat.

Other objects and advantages will be apparent from a consideration of the specification and claims.

According to the invention, the inner face of the sausage casings is provided with a thin hydrophilic layer of a thickness of about $0.03\mu$ to $3\mu$. Said layer is prepared from alginates, polyvinyl pyrrolidone, carboxymethyl celluloses, or mixtures thereof, and may be applied in the form of aqueous solutions, which preferably contain the hydrophilic material in a concentration of about 0.1 to 1 percent by weight.

The invention is particularly suitable for artificial sausage casings made from collagenous starting materials, such as depilated animal skin. Such skins, particularly cow splits, are increasingly used for the manufacture of sausage casings. The general procedure is as follows: Skin portions of suitable size are swollen by a treatment with suitable swelling agents, and shredded; the obtained swollen fibrous mass is forced through annular nozzles and formed into tubing, whereby revolving parts of the nozzle displace the fibers and arrange the same in intercrossing directions, so as to increase the strength of the final product. The thus obtained casings are hardened, for instance, by subjecting the same after drying to the action of conventional curing liquids or gases.

The hydrophilic coating is applied to the artificial casings, preferably during manufacture, for instance by continuously introducing an aqueous solution containing the hydrophilic agent immediately into, or after, the nozzle.

In practicing the method of the invention, the skin portions may be converted first into a plastic kneadable fibrous mass containing about 10 percent by weight of dry substances. A suitable procedure is disclosed, for instance, in German Patent No. 659,490. The manufacture of casings from such mass may be carried out, for instance as described in German Patent No. 650,887, and in U.S. Patent No. 2,896,254 by Emil Braun for "Manufacture of Thin Artificial Edible Sausage Casings."

A suitable apparatus for carrying out the invention is illustrated by way of example in the accompanying drawings, in which:

FIG. 1 is a longitudinal sectional view of an extruding nozzle, and

FIG. 2 is a similar view of another form of the extruding device;

FIG. 3 shows diagrammatically an enlarged cross-section of a casing obtained according to the invention.

In the drawings, in which like reference numerals designate like parts, the numeral 1 designates the nozzle housing to which the forward portion 2 is secured. An exchangeable sleeve 3 is carried by the inner core 3a. The parts 2 and 3 form the annular slot 4, in which the tubing is formed and extruded in direction of the arrow d. The swollen fibrous mass is fed through the passage m. The inner core 3a is provided with an axial bore through which air can be injected to inflate the tubing.

In order to adapt the device for carrying out the method of the invention, a tube 5 is placed into the central bore of the inner core 3a, which tube opens into an annular chamber 6 provided in the sleeve 3. From said chamber a number of fine apertures or passages 7, which may have a diameter of, for instance, about 1 mm., extend into the forward end of the sleeve. The number of said passages will depend on the width of the tubing; for a tubing of 60 mm., about 15 passages will be provided, and about 40 passages for a tubing of 120 mm. width.

At the front end of the sleeve 3, a member 8 is arranged to define with said front end an annular slot 9 of 0.2 to 0.4 mm. width, into which said passages 7 open.

The hydrophilic solution is forced by means of a metering pump through the tube 5, the annular chamber 6 and the passages 7 into the annular slot 9, from which it is spread on the inner face of the casing advancing through the tube-forming extruding slot 4.

In the modification of the apparatus shown in FIG. 2 the fibrous mass $m$ is forced at 19 into the annular slot 4 of the extruding nozzle, and the formed tubing leaves the nozzle at $d$. The inner core 3a is provided with a central bore 3b; a tube 15 is rotatably arranged in said bore and equipped at its end with a disc 17. In operation, the tube 15 and disc 17 are rotated at high speeds. The hydrophilic solution is forced by a metering pump in the direction of the arrow 18 into the rotating tube 15 from which it passes into the disc 17 and is sprayed in the form of fine droplets on the inner wall of the tubing extruded through the annular slot 4. In this way, the liquid is evenly distributed as a thin layer on the inside of the casings.

The amount of the hydrophilic agent applied to the inner walls of the casings will depend on the width and thickness of the casing and on the concentration of the solution. Thus at an hourly extrusion of 1200 m. tubing of 60 mm. $\phi$, 6 liters of a 0.4% solution of sodium alginate, and at an hourly extrusion of 400 m. of 20 mm. $\phi$ only 0.69 liter of the same solution are needed to obtain a treatment of 0.106 g. alginate per m.$^2$.

The following examples are given to illustrate the method of the invention.

*Example 1*

A fibrous paste prepared as set forth in Patent No. 2,896,254, recited above, is forced through an extruder, as shown in FIG. 1, having a nozzle diameter of 60 mm. at a rate producing 1000 m. of tubing per hour. At the same time, 30 liters per hour of a 1% aqueous sodium alginate solution are applied through conduit 5.

The obtained internally coated tubing is passed in the inflated state through a drying chamber, where it is dried at 50° C., and then tanned with wood smoke.

The casings obtained from said tubing can be readily skinned from sausage meat filled therein.

*Example 2*

The same procedure is applied as set forth in Example 1 but instead of the alginate solution, 70 liters of an 0.6% polyvinyl pyrrolidone solution are applied.

I claim:

1. A method of preparing readily removable artificial sausage casings comprising extruding swollen collagenous material prepared from depilated animal skin to form tubing, applying to the inside of said tubing an aqueous solution containing about 0.1 to 1 percent of hydrophilic compound selected from the group consisting of alginates, polyvinylpyrrolidone, carboxy mythylcelluloses, and mixtures thereof, in an amount producing a film of a thickness of about 0.03μ to 3.0μ on drying, and drying said internally coated tubing.

2. The method as claimed in claim 1, wherein said hydrophilic layer is applied during extrusion.

3. The method as claimed in claim 1, wherein said hydrophilic layer is applied immediately after extrusion of the tubing.

4. A readily removable artificial sausage casing, consisting of collagenous fibrous material coated on the inside with a layer of hydrophilic composition selected from the group consisting of alginates, polyvinylpyrrolidone, carboxy methylcelluloses, and mixtures thereof, said layer having a thickness of about 0.3μ to 3.0μ.

References Cited in the file of this patent

UNITED STATES PATENTS

| | | |
|---|---|---|
| 2,119,729 | Walter | June 7, 1938 |
| 2,201,457 | Smith et al. | May 21, 1940 |
| 2,709,138 | Weingand et al. | May 24, 1955 |

FOREIGN PATENTS

| | | |
|---|---|---|
| 736,673 | Great Britain | Sept. 14, 1955 |